(12) United States Patent  
Asami et al.

(10) Patent No.: US 12,403,666 B2  
(45) Date of Patent: Sep. 2, 2025

(54) LIGHT TRANSMITTING MEMBER AND METHOD OF PRODUCING THE SAME

(71) Applicant: CANON KABUSHIKI KAISHA, Tokyo (JP)

(72) Inventors: Eiko Asami, Kanagawa (JP); Yoji Teramoto, Kanagawa (JP); Shuhei Yamamoto, Tokyo (JP); Shun Ouchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 428 days.

(21) Appl. No.: 18/057,310

(22) Filed: Nov. 21, 2022

(65) Prior Publication Data

US 2023/0173772 A1 Jun. 8, 2023

(30) Foreign Application Priority Data

Dec. 3, 2021 (JP) .................................. 2021-197363  
Oct. 26, 2022 (JP) .................................. 2022-171695

(51) Int. Cl.
- *G02B 1/12* (2006.01)
- *B29D 11/00* (2006.01)
- *G02B 1/18* (2015.01)

(52) U.S. Cl.
CPC .......... *B29D 11/00884* (2013.01); *G02B 1/12* (2013.01); *G02B 1/18* (2015.01)

(58) Field of Classification Search
CPC .......... B29D 11/0073; B29D 11/00788; B29D 11/00884; G02B 1/11; G02B 1/12; G02B 1/18; G02B 2207/107

See application file for complete search history.

(56) References Cited

U.S. PATENT DOCUMENTS

| 9,712,729 B2 | 7/2017 | Yoshino et al. |
| 2012/0107607 A1 | 5/2012 | Takaki et al. |
| 2013/0136436 A1 | 5/2013 | Yoshino et al. |

FOREIGN PATENT DOCUMENTS

| JP | 2001-233611 A | 8/2001 |
| JP | 2005-283611 A | 10/2005 |
| JP | 2008-139581 A | 6/2008 |
| JP | 2014-92654 A | 5/2014 |
| WO | 2011/007543 A1 | 1/2011 |
| WO | 2019/124269 A1 | 6/2019 |

OTHER PUBLICATIONS

Teramoto et al., U.S. Appl. No. 18/057,312, filed Nov. 21, 2022.

*Primary Examiner* — Lawrence D Ferguson  
(74) *Attorney, Agent, or Firm* — Venable LLP

(57) ABSTRACT

Provided is a light transmitting member, which maintains an antifogging property over a long period of time, and is less liable to be contaminated with organic matter, the light transmitting member including, on a base material, a porous layer containing silicon oxide particles and a layer formed of a hydrophilic polymer, wherein a polymer ratio at a depth of 10 nm from a surface of the light transmitting member is 0.15 or more and 0.40 or less.

8 Claims, 1 Drawing Sheet

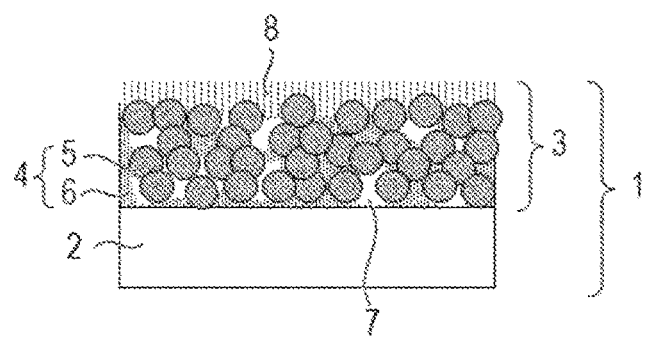

LIGHT TRANSMITTING MEMBER AND METHOD OF PRODUCING THE SAME

BACKGROUND OF THE INVENTION

Field of the Invention

The present invention relates to a light transmitting member excellent in antifogging property and optical performance.

Description of the Related Art

In order to withstand use in a wet situation, for example, in rain or under water, a transparent base material having various functional films on a surface thereof is used for an image pickup device, such as a surveillance camera, an underwater drone, or an underwater camera, or for swimming goggles.

In Japanese Patent Application Laid-Open No. 2014-92654, there is a disclosure of a dome-shaped camera cover having a hydrophilic film formed thereon to prevent water droplets and improve an antifouling property.

In Japanese Patent Application Laid-Open No. 2005-283611, there is a disclosure of an antireflection film to be used by being attached to, for example, various displays. In this film, a low-refractive index layer is formed on a light transmissive base material film. The low-refractive index layer contains hollow silica fine particles or porous silica fine particles, to thereby achieve suppression of reflection.

As described above, attempts have been made to improve the functions, such as hydrophilicity, antifouling property, antifogging property, and suppression of reflection, of a light transmitting member using a glass base material or a resin base material.

The surface of the transparent base material is fogged by water droplets adhering to the surface owing to a use environment. In addition, even when an antifogging property is imparted, the antifogging property is gradually degraded through contamination with organic matter during long-term use, and hence the base material becomes liable to be fogged. Particularly in an optical device, such as a camera or a display, the fogging occurring on the base material causes image degradation or poor visibility, and hence there is a high demand that the fogging be eliminated.

The present invention has been made in view of such related art.

SUMMARY OF THE INVENTION

The present invention provides a light transmitting member including: a light transmitting base material; and a functional film arranged on the base material, wherein the functional film includes a porous layer containing silicon oxide particles, and a hydrophilic polymer-containing layer containing a hydrophilic polymer having zwitterionic hydrophilic groups provided on the surface of the porous layer opposite to the base material, and wherein a ratio between an element derived from the hydrophilic polymer-containing layer and a silicon element at a depth of up to 10 nm from an uppermost surface of the functional film is 0.15 or more and 0.40 or less.

Further features of the present invention will become apparent from the following description of exemplary embodiments with reference to the attached drawing.

BRIEF DESCRIPTION OF THE DRAWINGS

FIG. 1 is a schematic view for illustrating an example of a light transmitting member.

DESCRIPTION OF THE EMBODIMENTS

An embodiment of the present invention is described below with reference to the drawing.

The present invention provides, as a first embodiment, a light transmitting member including: a light transmitting base material; and a functional film arranged on the base material, wherein the functional film includes a porous layer containing silicon oxide particles, and a hydrophilic polymer-containing layer containing a hydrophilic polymer having zwitterionic hydrophilic groups provided on the surface of the porous layer opposite to the base material wherein a ratio between an element derived from the hydrophilic polymer-containing layer and a silicon element at a depth of up to 10 nm from an uppermost surface of the functional film is 0.15 or more and 0.40 or less.

The present invention also provides, as a second embodiment, a method of producing a light transmitting member including the steps of: forming a porous layer, which contains silicon oxide particles, on a light transmitting base material; forming, on the porous layer, a coating film of a liquid containing a hydrophilic polymer having a zwitterionic hydrophilic group, to thereby obtain a light transmitting member before water washing; and subjecting the light transmitting member before water washing to water washing.

<Light Transmitting Member>

FIG. 1 is an example of a light transmitting member 1 according to this embodiment. The light transmitting member 1 may have any shape in accordance with its application. Examples of the shape of the light transmitting member 1 may include a film shape, a sheet shape, a plate shape, a lens shape, a dome shape, an approximately hemispherical dome shape, a spherical shape, and a three-dimensional shape formed of various flat surfaces or/and curved surfaces, and each of the shapes may include irregularities. The light transmitting member 1 preferably has such a thickness of a base material 2 as to be capable of keeping its shape, and the thickness does not need to be constant.

The light transmitting member 1 is a member having a high light transmittance. The light transmittance of the light transmitting member 1 is preferably 90.0% or more, more preferably 95.0% or more. Further, the average transmittance of the light transmitting member 1 in the wavelength range of 400 nm or more and 700 nm or less is preferably 90.0% or more, more preferably 95.0% or more. Moreover, its transmittance at every wavelength in the wavelength range of 400 nm or more and 700 nm or less is preferably 90.0% or more, more preferably 95.0% or more.

<Functional Film>

A functional film 3 is formed on part or the entirety of at least one surface of the base material 2. The functional film 3 includes a porous layer 4 containing silicon oxide particles 5, and includes, on the upper side thereof, a hydrophilic polymer-containing layer 8 containing a hydrophilic polymer having a zwitterionic hydrophilic group. In the specification of the present application, a term like "upper side" or "upper" is used when referring to a configuration in the light transmitting member 1, and a side on which the functional film 3 is formed with respect to the base material 2 is defined as the upper side, which is unrelated to the actual top and bottom and does not limit the shape of the base material 2 or the light transmitting member 1.

The functional film 3 may be formed on the entirety of any surface of the base material 2 or on part of the surface, and the surface encompasses a flat surface, a curved surface, a surface having irregularities, and the like. For example, in the case where the base material 2 has a plate shape, the functional film may be formed on the front and back thereof. In the case of a rectangular parallelepiped, the functional film may be formed on the entirety or part of one or more surfaces out of the six surfaces. In the case of a polyhedron, the functional film may be formed on the entirety or part of one or more surfaces out of its plurality of surfaces. In the case of a three-dimensional shape formed of various flat surfaces or/and curved surfaces, the functional film may be formed on the entirety or part of one or more surfaces out of those flat surfaces or/and curved surfaces.

The functional film 3 has a contact angle with pure water (water contact angle) of preferably 30° or less, more preferably 20° or less. In other words, a contact angle of the surface on the functional film side with pure water is preferably 30° or less, more preferably 20° or less. When the contact angle of the functional film 3 with pure water is 30° or less, water droplets adhering to its surface are hardly visible, and fogging caused by fine water droplets can be suppressed, with the result that an optical element having an excellent antifogging effect can be achieved.

In addition, the functional film 3 includes the hydrophilic polymer-containing layer 8 on the upper side thereof, but when the amount of the hydrophilic polymer is excessively small, high hydrophilicity becomes difficult to obtain, the water contact angle is increased, and there is a risk in that the hydrophilic polymer may be peeled off at the time of water washing. In addition, when the amount of the hydrophilic polymer is excessively large, the refractive index of the functional film 3 is increased, and a high reflection-suppressing effect becomes difficult to obtain. Accordingly, it is preferred that a ratio between an element derived from the hydrophilic polymer-containing layer and a silicon element at a depth of up to 10 nm from the uppermost surface of the functional film 3 be 0.15 or more and 0.40 or less. The element derived from the hydrophilic polymer-containing layer is preferably an element that is specifically contained in the hydrophilic polymer-containing layer, and is preferably an element contained in the zwitterionic hydrophilic group. Specifically, the element may be selected from the group consisting of: nitrogen; phosphorus; and sulfur, which are elements derived from a sulfobetaine group, a carbobetaine group, and a phosphorylcholine group. In particular, when the zwitterionic hydrophilic group includes a betaine group, a nitrogen atom is preferred. In addition, the thickness of the hydrophilic polymer-containing layer is preferably 1 nm or more and 20 nm or less, more preferably 3 nm or more and 10 nm or less. The thickness of the hydrophilic polymer-containing layer may be calculated using a method involving performing measurement with an X-ray photoelectron spectroscope while repeating etching of a predetermined thickness. Specifically, the thickness may be calculated from a value obtained by multiplying the thickness to be etched at a single time by the number of times of etching at each of which a nitrogen atom derived from the hydrophilic polymer is detected.

In order to obtain a high reflection-suppressing effect, the thickness of the functional film 3 is preferably 50 nm or more and 200 nm or less, more preferably 80 nm or more and 150 nm or less. In addition, the refractive index of the functional film 3 is preferably 1.25 or more and 1.36 or less, more preferably 1.27 or more and 1.34 or less. When the refractive index of the functional film 3 is less than 1.25, the strength of the functional film is difficult to obtain, and when the refractive index is more than 1.36, the reflection-suppressing effect tends not to be sufficiently obtained.

<Porous Layer>

The functional film 3 includes the porous layer 4 containing the silicon oxide particles 5. The porous layer 4 may further contain a binding material 6. The porous layer 4 has air gaps 7, which are gaps formed by the silicon oxide particles 5. The porous layer 4 only needs to be porous, and may be formed by replacing the silicon oxide particles 5 with an inorganic porous material other than the silicon oxide particles, an organic porous material, a water-absorbent polymer, or the like. However, the porous layer 4 is preferably an inorganic porous material formed of inorganic matter from the viewpoint of high strength of the film, and the inorganic matter is preferably silicon oxide, zirconium oxide, or titanium oxide, most suitably silicon oxide. The air gaps 7 may be connected to each other, and may communicate to the uppermost surface (surface) of the functional film 3. The volume of the air gaps 7 is defined by an average pore diameter, and the average pore diameter is obtained through pore distribution measurement by a nitrogen gas adsorption method. The average pore diameter of the air gaps 7 is preferably 50 nm or less. When the pore diameter is more than 100 nm, light scattering occurs. When the average pore diameter of the air gaps 7 is 50 nm or less, the number of air gaps each having a pore diameter of more than 100 nm is small, and hence high transparency of the functional film 3 can be maintained without the occurrence of light scattering. The average pore diameter of the air gaps 7 is more preferably 20 nm or less.

The binding material 6 is suitably an inorganic material such as silicate, and is preferably substantially free of a resin that is an organic polymer. When the silicon oxide particles 5, which are an inorganic material (silica), are bound to each other by the binding material 6 that is an inorganic material (silicate), the porous layer 4 having high transparency and high strength can be formed.

The silicon oxide particles 5 have an average particle diameter of preferably 10 nm or more and 80 nm or less, more preferably 12 nm or more and 60 nm or less. When the average particle diameter of the silicon oxide particles 5 is less than 10 nm, the air gaps 7 both between the particles and in the particles are so small as to reduce the transparency of the functional film 3. In addition, a case in which the average particle diameter is more than 80 nm is not preferred because the sizes of the air gaps 7 between the particles are large, and hence large voids are liable to be generated, and besides, scattering due to the sizes of the particles occurs.

Herein, the average particle diameter of the silicon oxide particles 5 is an average Feret diameter. The average Feret diameter may be measured by image processing of an image observed with a transmission electron microscope. Commercially available image processing software such as Image-Pro Plus (manufactured by Media Cybernetics, Inc.) may be used as a method for the image processing. In a predetermined image area, contrast adjustment is appropriately performed as required, and the average Feret diameter of the respective particles is measured by particle measurement, thereby being able to calculate an average value.

The silicon oxide particles 5 contained in the porous layer 4 may include such particles as solid particles, chain-shaped particles, or hollow particles.

The solid particles may each have any of a true circular shape, an elliptical shape, a disc shape, a rod shape, a needle shape, a chain shape, or a square shape, and two or more kinds of particles may be used as a mixture thereof.

The chain-shaped particles each have a shape in which a plurality of solid particles are connected to each other. That is, the air gaps 7 are each present while communicating to a plurality of chain-shaped particles. The chain-shaped particles maintain chain-shaped or bead-shaped connections thereof even when the chain-shaped particles form a film, and hence an air gap ratio can be increased as compared to the case of using single particles. The number of particles connected in one chain-shaped particle is 2 or more and 10 or less, preferably 3 or more and 6 or less. When the number of connected particles is more than 10, large air gaps 7 are liable to be generated, resulting in a decrease in abrasion resistance.

The hollow particles each contain a gas (refractive index: 1.0) in the hollow portion thereof, and hence the use of the hollow particles can increase the transparency of the porous layer 4. The hollow portion to be used may be monoporous or multiporous. The hollow particles may be produced by a method described in, for example, Japanese Patent Application Laid-Open No. 2001-233611 or Japanese Patent Application Laid-Open No. 2008-139581. When the silicon oxide particles 5 are the hollow particles, the silicon oxide particles 5 are formed into a multi-layered stack while being aligned in a direction parallel to the surface of the base material 2, and hence the transparency of the functional film 3 can be increased.

The silicon oxide particles 5 each contain silicon oxide as a main component, and the particles may each also contain a metal oxide, such as aluminum oxide, titanium oxide, zinc oxide, or zirconium oxide.

The silicon oxide particles 5 each preferably have a silanol group remaining on the surface of the particle. The silanol group on the particle surface increases the interaction and reactivity between the particles or between the particle and the binding material 6, and hence a functional film having high mechanical strength can be obtained. Further, the interaction between the porous layer and the hydrophilic polymer is also increased, and hence the hydrophilic polymer becomes less liable to be peeled from the porous layer.

<Hydrophilic Polymer-Containing Layer>

The hydrophilic polymer-containing layer 8 is a layer containing a hydrophilic polymer. By virtue of the functional film 3 having the hydrophilic polymer-containing layer 8 on the upper side thereof, the water contact angle of the surface of the functional film 3 with respect to water is reduced, and the light transmitting member 1 exhibits an antifogging property.

In the present invention, the hydrophilic polymer is a hydrophilic polymer having a zwitterionic hydrophilic group. The zwitterionic hydrophilic group is preferably any one of a sulfobetaine group, a carboxybetaine group, or a phosphorylcholine group. As the hydrophilic polymer for forming the hydrophilic polymer-containing layer 8, for example, an acrylic resin, a methacrylic resin, a polyurethane-based resin, a polyimide-based resin, a polyamide-based resin, an epoxy resin, a polystyrene-based resin, a polyester-based resin, a modified product thereof, or a mixture thereof may be used. In the hydrophilic polymer-containing layer, the molecule of the hydrophilic polymer may have two or more zwitterionic hydrophilic groups. In addition, it is desired that the molecule of the hydrophilic polymer to be used have a silanol group. If the molecule of the hydrophilic polymer has a silanol group, when the hydrophilic polymer-containing layer is formed, the silanol group of the hydrophilic polymer has a strong interaction, such as a hydrogen bond or a covalent bond, with the silanol group of each of the silicon oxide particles 5. As a result, the hydrophilic polymer becomes less liable to be peeled from the functional film 3.

In addition, the functional film 3 becomes liable to be contaminated with organic matter when not having the hydrophilic polymer-containing layer 8 on the upper surface thereof. In particular, when the surface of the porous layer 4 is touched with a bare hand under a state in which the hydrophilic polymer-containing layer 8 is absent, an oil and fat component included in the hand adheres to the contact portion, and the adhering oil and fat component penetrates into the porous layer 4. The oil and fat component that has penetrated remains in the air gaps 7 in the porous layer, and hence the functional film 3 has an increased water contact angle, that is, reduced hydrophilicity, resulting in reduced transparency. In addition, the oil and fat component that has penetrated into the porous layer 4 is difficult to remove, and hence, once the oil and fat component has penetrated, the hydrophilicity and transparency of the functional film 3 are difficult to return to their original levels.

Meanwhile, when the functional film 3 has the hydrophilic polymer-containing layer 8 on the upper surface thereof, the oil and fat component is less liable to penetrate into the porous layer 4, and even if a bare hand is brought into contact therewith, the oil and fat component remains on the upper surface of the functional film. Besides, when water is brought into contact with the functional film 3, the water permeates an interface between the hydrophilic polymer and the oil and fat component. As a result, the oil and fat component floats up, and then can be easily washed away with running water, and hence hardly affects the water contact angle or the transparency of the functional film 3.

<Water Washing>

The "water washing" in the present invention, as performed once, refers to the following: with use of a water bath having arranged therein an ultrasonic wave oscillator of 20 kHz or more and 50 kHz or less and 200 W or more and 500 W or less, the light transmitting member or part of the light transmitting member is immersed in water in the water having applied thereto ultrasonic vibration for from 30 seconds to 1 minute, and is dried. The temperature of the water is preferably 18° C. or more and 25° C. or less, more preferably 20° C. or more and 23° C. or less.

The light transmitting member of the present invention is obtained by subjecting a light transmitting member before water washing, which has formed thereon a coating film of a liquid containing a hydrophilic polymer, to water washing. Thus, a polymer having a weak interaction with the porous layer 4 in the functional film 3 is removed from the film by water, and only a polymer having a strong interaction remains in the film. The polymer having a strong interaction is hardly removed from the functional film 3 even when water washing is further repeated. Accordingly, the hydrophilicity of the functional film 3 can be maintained for a long period of time to enable the light transmitting member to maintain its antifogging property and be protected from contamination with organic matter.

That is, the ratio between the element derived from the hydrophilic polymer-containing layer and the silicon element (hydrophilic polymer content ratio) at a depth of up to 10 nm from the uppermost surface of the light transmitting member of the present invention is 0.15 or more and 0.40 or less, preferably 0.20 or more and 0.30 or less. Besides, even after the light transmitting member has undergone the water washing, the hydrophilic polymer content ratio at a depth of up to 10 nm from the uppermost surface of the light transmitting member is 0.15 or more and 0.40 or less, preferably 0.20 or more and 0.30 or less. When the hydrophilic polymer content ratio is less than 0.15, the functional film 3 does not sufficiently exhibit a protective effect against organic matter contamination. In addition, when the hydrophilic polymer content ratio is more than 0.40, the functional film 3 has an increased refractive index and does not sufficiently exhibit a reflection-suppressing effect. In a production process for the light transmitting member, the water washing is preferably repeated at least 3 or more times, and more preferably at least 3 or more times and 5 or less times.

<Base Material>

The base material 2 of the light transmitting member 1 is not particularly limited as long as the base material is excellent in processability and has transparency, and is preferably a resin, glass, or a combination thereof. Examples of the resin include a polyester resin, such as polyethylene terephthalate (PET) or polybutylene terephthalate (PBT), a polycarbonate (PC) resin, a cellulose triacetate (TAC) resin, a cycloolefin (COP) resin, a polymethyl methacrylate (PMMA) resin, an acrylic polyvinyl alcohol (PVA) resin, and mixtures thereof.

In addition, it is more preferred that a raw material for the resin be free of particles. When the raw material is free of particles, scattering due to the raw material particles in the resin can be reduced, and hence the base material 2 having high transparency and being excellent in visibility can be obtained.

In addition, inorganic glass containing, for example, zirconium oxide, titanium oxide, tantalum oxide, niobium oxide, hafnium oxide, lanthanum oxide, gadolinium oxide, silicon oxide, calcium oxide, barium oxide, sodium oxide, potassium oxide, boron oxide, aluminum oxide, or a mixture thereof may be used as the glass. Glass formed by grind polishing, mold forming, float forming, or the like may be used as the glass.

For the purpose of improving the adhesiveness to the functional film 3, strength, flatness, and the like of the base material 2, or imparting a function, such as a reflection-suppressing effect or an antiglare effect, the surface of the base material 2 may be washed or polished, or an adhesive layer, a hard coat layer, a refractive index-regulating layer, or the like may be arranged as an intermediate layer between the base material 2 and the functional film 3. The intermediate layer plays a role in preventing the diffusion of impurities from the base material 2, and in enhancing the reflection-suppressing effect of the functional film 3. Suitable examples of the intermediate layer include: a high-refractive index layer containing zirconium oxide, titanium oxide, tantalum oxide, niobium oxide, or hafnium oxide; a low-refractive index layer containing silicon oxide or magnesium fluoride; aluminum oxide; and a polymer. The intermediate layer may be a single layer formed of any of the above-mentioned materials, or may be a laminate of a plurality of kinds of layers, but is preferably a layer in which a high-refractive index layer having a relatively high refractive index and a low-refractive index layer having a relatively low refractive index are alternately laminated. The high-refractive index layer preferably has a refractive index of 1.4 or more, and the low-refractive index layer preferably has a refractive index of less than 1.4. A method of producing the light transmitting member 1 includes the steps of: applying a coating liquid for forming the functional film 3 onto the base material 2 to form a coating film; and drying and/or curing (calcining) the coating film to form the functional film 3.

Example of Production

An example of the production of the light transmitting member 1 of the present invention is described below.

The functional film 3 may be produced in the following manner: first, a silicon oxide particle coating liquid is applied onto the base material 2, and dried and/or cured to form the porous layer 4, and then, a hydrophilic polymer coating liquid is applied to the upper surface of the porous layer 4, and dried to form the hydrophilic polymer-containing layer 8, followed by water washing.

Examples of a method for the application include gravure coating, die coating, spin coating, blade coating, roll coating, slit coating, printing, and dip coating. In particular, when the light transmitting member 1 having a three-dimensionally complicated shape with a convex surface or a concave surface, such as a dome shape or a spherical shape, and including a thin film is produced, a spray method, spin coating, or the like may be used.

In addition, in the case of the application of the coating liquid onto a large area of a thin base material, such as a film or a sheet, gravure coating is preferred from the viewpoint of the uniformity of a thickness. Micro-gravure coating, which is capable of forming a thin film in the order of 100 nm, is more preferred. In particular, in the case of the application of the coating liquid onto a roll-shaped long film, roll-to-roll micro-gravure coating is preferred.

The drying and/or the curing is a step for removing a solvent, and the temperature of the drying and/or the curing depends on the heat-resistant temperature of the base material 2, but is preferably 20° C. or more and 200° C. or less. A period of time for the drying and/or the curing may be a period of time that does not influence the base material 2 and enables the organic solvent in the layer to be evaporated, but is preferably 10 minutes or more and 200 hours or less, more preferably 30 minutes or more and 24 hours or less.

According to this production method, the light transmitting member 1 having high transparency, having a low water contact angle, and being less liable to be contaminated with organic matter can be produced, and the light transmitting member 1 can maintain its performance even after water washing. The porous layer 4 of the light transmitting member 1 enables the functional film 3 having high transparency to be achieved through uniform coating with a dispersion liquid of the silicon oxide particles 5. In addition, when the binding material 6 formed of an inorganic material is used for bonding the silicon oxide particles 5 to each other, the transparency can be increased as compared to the porous layer 4 using the binding material 6 formed of a resin material. The binding material formed of a resin material (binder resin) is not preferred. When the porous layer 4 contains a large amount of resin, the transparency of the functional film 3 is reduced to cause reflection, and besides, at the time of the volatilization of the organic solvent in the coating liquid, the silicon oxide particles 5 bind with the binder resin, and hence the silicon oxide particles 5 are liable to aggregate. The organic solvent of the coating liquid volatilizes more quickly on the upper surface side of the coating film, and hence, even when the formation of irregularities by the silicon oxide particles 5 on the upper surface of the coating film, where drying proceeds quickly, can be suppressed, the arrangement of the silicon oxide particles 5 on the lower surface side of the coating film may be deteriorated.

Accordingly, when the binder resin is used, it is difficult to further improve the reflection-suppressing effect and the transparency.

At the time of the application of the hydrophilic polymer coating liquid to the upper surface of the porous layer 4, for the purpose of increasing the ratio of the hydrophilic polymer molecule capable of having a strong interaction with the silicon oxide particles 5 contained in the porous layer 4, it is preferred that the coating liquid be brought into contact, while in a state of having high fluidity, with the upper surface of the porous layer 4 for a long period of time. The period of time of the contact between the porous layer 4 and the hydrophilic polymer coating liquid is preferably 20 seconds or more and 2 minutes or less, more preferably 30 seconds or more and 1 minute or less. When the period of time is less than 20 seconds, the hydrophilic polymer-containing layer 8 is removed after long-term use, with the result that the light transmitting member 1 becomes liable to be contaminated with organic matter. In addition, when the period of time is longer than 2 minutes, the drying of the coating liquid proceeds to make it difficult to maintain a liquid film. As long as the period of time for which the hydrophilic polymer coating liquid is brought into contact with the upper surface of the porous layer 4 is satisfied as described above, a method for the application is not limited, and the hydrophilic polymer coating liquid may be applied by spin coating or an immersion method.

For example, when the hydrophilic polymer coating liquid is applied by spin coating, it is preferred that: the base material 2 having the porous layer 4 formed thereon be set with the porous layer 4 being directed toward an upper surface; then the hydrophilic polymer coating liquid be appropriately dropped onto the porous layer 4 to form a liquid film of the hydrophilic polymer coating liquid over the entire surface; and while the liquid film is maintained, the base material 2 be rotated for 20 seconds or more at a low speed of 1,000 rpm or less. After that, the base material 2 is rotated at a high speed of 1,000 rpm or more to remove water. Thus, the hydrophilic polymer-containing layer may be formed.

In addition, the hydrophilic polymer coating liquid is diluted with a solvent capable of dissolving the hydrophilic polymer molecule, such as water or an alcohol, and the concentration of the hydrophilic polymer molecule is desirably 0.3 mass % or more and 10 mass % or less. In order to increase the ratio of the hydrophilic polymer molecule capable of interacting with the silicon oxide particles 5 at the time of the application, the concentration is preferably 0.3 mass % or more, more preferably 0.5 mass %. Further, a high concentration causes a deterioration in appearance due to film formation unevenness, and hence the concentration is preferably 10 mass % or less, more preferably 3 mass % or less.

EXAMPLES

A specific method of producing the light transmitting member according to the present invention is described below.

(1) Preparation of Silicon Oxide Particle Coating Liquid A

While 1-ethoxy-2-propanol (hereinafter sometimes abbreviated as "1E2P") was added to 580 g of a 2-propanol (hereinafter sometimes abbreviated as "IPA") dispersion liquid of hollow silicon oxide particles (THRULYA 1110 manufactured by JGC Catalysts and Chemicals Ltd., average particle diameter: about 50 nm, shell thickness: about 10 nm, solid content concentration: 20.5 mass %), IPA was distilled off by heating. IPA was distilled off until the solid content concentration became 19.5 mass %, to thereby prepare 610 g of a 1E2P solvent replacement liquid of the hollow silicon oxide particles (hollow silicon oxide particle liquid).

In another container, a solution formed of 1.7 g of nitric acid water (concentration: 3.7 mass %) diluted in advance and 2.30 g of ethanol was slowly added to a solution formed of 4.17 g of ethyl silicate and 2.30 g of ethanol. The mixture was stirred at room temperature for 15 hours, and then 2.00 g of the weighed reaction solution was diluted with 36.33 g of 2-ethyl-1-butanol to prepare silica sol (solid content concentration: 0.6 mass %).

The 1E2P solvent replacement liquid of the hollow silicon oxide particles was diluted with ethyl lactate so that the solid content concentration became 3.9 mass %.

The silica sol was added to the resultant so that the ratio of the hollow silicon oxide particles to the silica sol component became 100/12. Further, the resultant was mixed and stirred at room temperature for 2 hours to provide a coating liquid A containing hollow silicon oxide particles.

(2) Preparation of Silicon Oxide Particle Coating Liquid B 142.50 g of 1E2P was added to 50.00 g of an IPA dispersion liquid of chain-shaped silicon oxide particles (IPA-ST-UP manufactured by Nissan Chemical Industries, Ltd., average particle diameter: 12 nm, solid content concentration: 15 mass %). After that, the mixture was concentrated by removing IPA with a rotary evaporator to prepare chain-shaped silicon oxide particle liquid (solid content concentration: 5.0 mass %).

In another container, 13.82 g of ethanol and an aqueous solution of nitric acid (concentration: 3%) were added to 12.48 g of ethyl silicate, and the mixture was stirred at room temperature for 10 hours to prepare silica sol (solid content concentration: 11.5 mass %).

After 50.00 g of the chain-shaped silicon oxide particle liquid had been diluted with 65.67 g of 1E2P, 3.26 g of the silica sol was added, and the mixture was stirred at room temperature for 10 minutes. After that, the mixture was stirred at 50° C. for 1 hour to prepare a silicon oxide particle coating liquid B.

(3) Preparation of Silicon Oxide Particle Coating Liquid C

A coating liquid C containing hollow silicon oxide particles was obtained by being prepared in the same manner as the silicon oxide particle coating liquid A except that the amount of the silica sol to be added to the 1E2P solvent replacement liquid of the hollow silicon oxide particles was set to achieve a ratio "hollow silicon oxide particles: silica sol component" of 100/3.

(4) Preparation of Hydrophilic Polymer Coating Liquid A 5 g of an aqueous solution of an acrylic polymer having a sulfobetaine group (LAMBIC-771W manufactured by Osaka Organic Chemical Industry Ltd., solid content concentration: 10 mass %) was diluted with 95 g of pure water, and the resultant was stirred at room temperature for 10 minutes to provide a hydrophilic polymer coating liquid A.

(5) Preparation of Hydrophilic Polymer Coating Liquid B 30 g of an aqueous solution of an acrylic polymer having a sulfobetaine group (LAMBIC-771W manufactured by Osaka Organic Chemical Industry Ltd., solid content concentration: 10 mass %) was diluted with 70 g of pure water, and the resultant was stirred at room temperature for 10 minutes to provide a hydrophilic polymer coating liquid B.

(6) Preparation of Hydrophilic Polymer Coating Liquid C 2.5 g of an aqueous solution of an acrylic polymer having a sulfobetaine group (LAMBIC-771W manufactured by Osaka Organic Chemical Industry Ltd., solid content concentration: 10 mass %) was diluted with 97.5 g of pure water, and the resultant was stirred at room temperature for 10 minutes to provide a hydrophilic polymer coating liquid C.

(7) Preparation of Hydrophilic Polymer Coating Liquid D 1.66 g of an ethanol solution of a polymer having a carboxybetaine group (N-methylcarboxybetaine-methacrylic acid alkyl ester copolymer) (RAM Resin manufactured by Osaka Organic Chemical Industry Ltd., solid content concentration: 30 mass %) was diluted with 98.34 g of 1-methoxy-2-propanol (manufactured by Kanto Chemical Co., Inc., special grade), and the resultant was stirred at room temperature for 10 minutes to provide a hydrophilic polymer coating liquid D.

(8) Preparation of Hydrophilic Polymer Coating Liquid E 1.25 g of an aqueous solution of an acrylic polymer having a sulfobetaine group (LAMBIC-771W manufactured by Osaka Organic Chemical Industry Ltd., solid content concentration: 10 mass %) was diluted with 97.5 g of pure water, and the resultant was stirred at room temperature for 10 minutes to provide a hydrophilic polymer coating liquid E.

Example 1

An appropriate amount of the silicon oxide particle coating liquid A was dropped onto a φ30 mm flat-plate glass substrate having a thickness of 1 mm (S-BSL7, nd=1.52, manufactured by Ohara Inc.) serving as a base material, and spin coating was performed at 3,200 rpm for 20 seconds, followed by calcining in a hot air-circulating oven at 140° C. for 30 minutes to form the porous layer 4. Next, an appropriate amount of the hydrophilic polymer coating liquid A was dropped onto the porous layer 4, and the whole was rotated at 500 rpm for 30 seconds and then rotated for 20 seconds with the rotation number changed to 3,500 rpm. After that, the resultant was calcined in a hot air-circulating oven at 80° C. for 30 minutes.

Next, the substrate was washed by being immersed in a water bath at 20° C., in which an ultrasonic wave was output at 36 kHz and 280 W from an ultrasonic wave oscillator, for 30 seconds, and was then dried with warm air set to 60° C. Thus, a light transmitting member of Example 1 was obtained.

<Measurement of Refractive Index and Thickness>

The refractive index of the functional film 3 was evaluated as described below. Measurement results for light having a wavelength of from 380 nm to 800 nm were obtained using a spectroscopic ellipsometer (VASE, manufactured by J. A. Woollam Japan), and were analyzed to determine the refractive index and thickness. The refractive index used was a refractive index at a wavelength of 550 nm.

<Ratio of Hydrophilic Polymer>

The ratio of the hydrophilic polymer at 10 nm from the surface of the light transmitting member was calculated from the results of measurement performed by such a procedure as described below.

Through use of an X-ray photoelectron spectroscope (Quantera II manufactured by ULVAC-PHI, Inc.), while a 2 mm×2 mm square region was etched for 30 seconds with an Ar ion beam having an acceleration voltage of 100 V, analysis was repeated 20 times to measure the detection intensities of silicon and nitrogen. Measurement was performed on the assumption that silicon was derived from the silicon oxide particles, and nitrogen was derived from the nitrogen element in the sulfobetaine group, the carbobetaine group, or the phosphorylcholine group included in the zwitterionic hydrophilic group of the hydrophilic polymer. The depth of a groove from the surface after 20 times of etching was measured. As a result, the depth was recognized to be about 100 nm, and it was found that etching was performed to a depth of 5 nm by one etching process. The average values of the detection intensities of silicon and nitrogen in the first two times were defined as element concentrations at a depth of up to 10 nm from the surface (uppermost surface), and the value of the ratio of the nitrogen element concentration to the silicon element concentration was defined as the ratio of the hydrophilic polymer.

<Evaluation of Water Contact Angle>

Through use of a fully automatic contact angle meter (DM-701 manufactured by Kyowa Interface Science Co., Ltd.), a contact angle (water contact angle) at a time when a liquid droplet of 2 μl of pure water was brought into contact at 23° C. and 50% RH was measured. The water contact angle was evaluated by the following criteria.

Good: 20° or less
Acceptable: more than 20° and 30° or less
Unacceptable: more than 30°

<Evaluation of Visibility during Use of Light Transmitting Member as Transparent Cover>

A camera for evaluation having the light transmitting member arranged as a cover so that the functional film faced outward was arranged above a hot water bath at 80° C., and visibility under this state was evaluated.

As a viewpoint for image evaluation, the presence or absence of the degradation of a camera image was evaluated as compared to a base material not having the functional film formed thereon. The image was evaluated by the following criteria.

A: The image is significantly improved as compared to the base material not having the functional film 3 formed thereon.
B: The image viewed is somewhat improved as compared to the base material not having the functional film 3 formed thereon.
C: There is no significant difference in visibility as compared to the base material not having the functional film 3 formed thereon.

<High-Temperature and High-Humidity Test and Visibility Evaluation Thereafter>

The produced light transmitting member was held under an environment at a temperature 60° C. and 90% for 1,000 hours in a constant temperature and humidity tester (Espec Corp., PL-2KP). It is conceived that this test corresponds to 10-year use. The water contact angle of the light transmitting member after the test was measured, and its visibility was evaluated.

<Organic Matter Contamination Evaluation>

Several droplets of lipophilic n-hexadecane were dropped onto the surface of the functional film on the light transmitting member after the above-mentioned high-temperature and high-humidity test, and then spin coating was performed at 1,000 rpm for 20 seconds to apply n-hexadecane to the entire surface of the functional film. The resultant was left to stand still as it was at room temperature for 10 minutes, followed by water washing with running water for 30 seconds. After that, the washed product was dried in an oven at 80° C. until water droplets on the surface disappeared, and was then taken out of the oven and cooled to room temperature. The water contact angle of the light transmitting member after the cooling was measured, and its visibility was evaluated.

It is conceived that, through this organic matter contamination evaluation performed after the high-temperature and high-humidity test, it can be recognized whether the light transmitting member after 10-year use is liable to be contaminated with organic matter.

Example 2

The same treatment as in Example 1 was performed except that the hydrophilic polymer coating liquid B was used in place of the hydrophilic polymer coating liquid A.

Example 3

The same treatment as in Example 1 was performed except that the silicon oxide particle coating liquid B was used in place of the silicon oxide particle coating liquid A.

Example 4

The same treatment as in Example 1 was performed except that the silicon oxide particle coating liquid C was used in place of the silicon oxide particle coating liquid A.

Example 5

The same treatment as in Example 1 was performed except that the hydrophilic polymer coating liquid D was used in place of the hydrophilic polymer coating liquid A.

Comparative Example 1

The same treatment as in Example 1 was performed except that the silicon oxide particle coating liquid C was used in place of the silicon oxide particle coating liquid A and the hydrophilic polymer coating liquid E was used in place of the hydrophilic polymer coating liquid A.

Comparative Example 2

The same treatment as in Example 1 was performed except that no hydrophilic polymer coating liquid was applied.

TABLE 1

| | Silicon oxide particle coating liquid (kind of particles) | Hydrophilic liquid polymer coating (kind of hydrophilic group) | Refractive index | Thickness (nm) | After water washing | | | After high-temperature and high-humidity test | | | After organic matter contamination evaluation | | |
|---|---|---|---|---|---|---|---|---|---|---|---|---|---|
| | | | | | Ratio of hydrophilic polymer (N/Si) | Pure water contact angle | Visibility | Ratio of hydrophilic polymer (N/Si) | Pure water contact angle | Visibility | Ratio of hydrophilic polymer (N/Si) | Pure water contact angle | Visibility |
| Example 1 | A (Hollow particles) | A (Sulfobetaine group) | 1.28 | 110 | 0.22 | Good (10°) | A | 0.20 | Good (10°) | A | 0.20 | Good (12°) | A |
| Example 2 | A (Hollow particles) | B (Sulfobetaine group) | 1.32 | 112 | 0.36 | Good (8°) | A | 0.36 | Good (8°) | A | 0.36 | Good (9°) | A |
| Example 3 | B (Chain-shaped particles) | A (Sulfobetaine group) | 1.28 | 110 | 0.20 | Acceptable (18°) | A | 0.19 | Acceptable (18°) | A | 0.18 | Acceptable (25°) | B |
| Example 4 | C (Hollow particles) | A (Sulfobetaine group) | 1.25 | 108 | 0.16 | Acceptable (22°) | A | 0.16 | Acceptable (22°) | A | 0.15 | Acceptable (25°) | B |
| Example 5 | A (Hollow particles) | D (Carbobetaine group) | 1.28 | 110 | 0.20 | Acceptable (15°) | A | 0.18 | Acceptable (23°) | A | 0.18 | Acceptable (28°) | B |
| Comparative Example 1 | C (Hollow particles) | E (Sulfobetaine group) | 1.24 | 106 | 0.05 | Acceptable (25°) | C | 0.05 | Acceptable (25°) | C | 0.05 | Unacceptable (47°) | C |
| Comparative Example 2 | A (Hollow particles) | — | 1.23 | 105 | 0 | Acceptable (25°) | C | 0 | Acceptable (25°) | C | 0 | Unacceptable (55°) | C |

The results are shown in Table 1. It was able to be recognized that the light transmitting members of Examples 1 to 5 had such functions as to be satisfactorily used in various applications.

[Evaluation of Ratio of Hydrophilic Polymer when Water Washing is Repeated]

In the same manner as in Examples described above, the silicon oxide particle coating liquid A was applied onto a flat-plate glass substrate by spin coating, followed by calcining to form a porous layer. Further, the hydrophilic polymer coating liquid A was dropped, and applied through rotation at 500 rpm for 30 seconds, followed by rotation for 20 seconds with the rotation number changed to 3,500 rpm. After that, the resultant was calcined in a hot air-circulating oven at 80° C. for 30 minutes to form a hydrophilic polymer-containing layer having a zwitterionic hydrophilic group. After the formation of the hydrophilic polymer-containing layer, the ratio of the hydrophilic polymer at 10 nm from the surface before water washing was performed (before water washing) was determined in accordance with the above-mentioned ratio of the hydrophilic polymer. In addition, the thicknesses of the porous layer and the hydrophilic polymer-containing layer were measured in accordance with the above-mentioned method.

Next, the substrate was immersed in a water bath at 20° C., in which an ultrasonic wave was output at 36 kHz and 280 W from an ultrasonic wave oscillator, for 30 seconds, and was then dried with warm air set to 60° C. (water washing 1), followed by the determination of the ratio of the hydrophilic polymer. In addition, at this time, the thicknesses of the functional film and the porous layer were measured, and the thickness of the hydrophilic polymer-containing layer was determined therefrom. Water washing was further repeated twice (water washing 2 and water washing 3), and each washing was similarly followed by the determination of the ratio of the hydrophilic polymer and the thickness of the hydrophilic polymer-containing layer. The results are shown in Table 2.

TABLE 2

|  | Before water washing | Water washing 1 | Water washing 2 | Water washing 3 |
|---|---|---|---|---|
| Thickness of hydrophilic polymer-containing layer (nm) | 4.68 | 2.64 | 2.53 | 2.21 |
| Ratio of hydrophilic polymer (N/Si) | 1 | 0.35 | 0.35 | 0.33 |

According to the present invention, the light transmitting member, which maintains an antifogging property over a long period of time, and is less liable to be contaminated with organic matter, can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-197363, filed Dec. 3, 2021, and Japanese Patent Application No. 2022-171695, filed Oct. 26, 2022, which are hereby incorporated by reference herein in their entirety.

What is claimed is:

1. A light transmitting member comprising:
   a light transmitting base material; and
   a functional film arranged on the base material,
   wherein the functional film includes a porous layer containing a plurality of silicon oxide particles, and a hydrophilic polymer-containing layer containing a hydrophilic polymer having a zwitterionic hydrophilic group provided on a surface of the porous layer opposite to the base material, and
   wherein a ratio between an element derived from the hydrophilic polymer-containing layer and a silicon element at a depth of up to 10 nm from an uppermost surface of the functional film is 0.15 to 0.40.

2. The light transmitting member according to claim 1, wherein the hydrophilic polymer has at least one of a sulfobetaine group, a carbobetaine group, or a phosphorylcholine group.

3. The light transmitting member according to claim 1, wherein the element derived from the hydrophilic polymer-containing layer is any one element selected from the group consisting of: nitrogen; phosphorus; and sulfur.

4. The light transmitting member according to claim 3, wherein the element derived from the hydrophilic polymer-containing layer is nitrogen.

5. The light transmitting member according to claim 1, wherein the functional film has a thickness of 50 nm to 200 nm.

6. The light transmitting member according to claim 1, wherein the functional film has a refractive index of 1.25 to 1.36.

7. The light transmitting member according to claim 1, wherein the light transmitting member has a contact angle of 30° or less with pure water on a surface thereof on a functional film side.

8. The light transmitting member according to claim 1, wherein the plurality of silicon oxide particles are bound to each other by a silicate.

* * * * *